United States Patent
Choi et al.

(10) Patent No.: US 10,141,551 B2
(45) Date of Patent: Nov. 27, 2018

(54) BATTERY SYSTEM

(71) Applicant: SAMSUNG SDI CO., LTD., Yongin-si, Gyeonggi-do (KR)

(72) Inventors: Jongrock Choi, Yongin-si (KR); Jeongkurn Park, Yongin-si (KR); Junyoung Kim, Yongin-si (KR); Cheolgi Son, Yongin-si (KR); Hwasu Kim, Yongin-si (KR); Sujun Park, Yongin-si (KR); Dongrak Kim, Yongin-si (KR); Kwangmin Yoo, Yongin-si (KR); Hyunjun Do, Yongin-si (KR); Inseob Song, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 70 days.

(21) Appl. No.: 15/230,783

(22) Filed: Aug. 8, 2016

(65) Prior Publication Data
US 2017/0054303 A1  Feb. 23, 2017

(30) Foreign Application Priority Data

Aug. 20, 2015  (KR) .................. 10-2015-0117343

(51) Int. Cl.
| | |
|---|---|
| *H02J 7/00* | (2006.01) |
| *H01M 2/10* | (2006.01) |
| *H01M 10/44* | (2006.01) |
| *H01M 10/42* | (2006.01) |
| *H01M 2/30* | (2006.01) |

(52) U.S. Cl.
CPC .......... *H01M 2/1016* (2013.01); *H01M 2/30* (2013.01); *H01M 10/425* (2013.01);
(Continued)

(58) Field of Classification Search
CPC .... H01M 2/1016; H01M 2/30; H01M 10/425; H01M 10/44
(Continued)

(56) References Cited

U.S. PATENT DOCUMENTS

| | | | |
|---|---|---|---|
| 8,907,597 B2 | 12/2014 | Kim et al. | |
| 2001/0024105 A1* | 9/2001 | Abe | B60L 11/1851 320/132 |

(Continued)

FOREIGN PATENT DOCUMENTS

| | | |
|---|---|---|
| JP | 08-322159 A | 12/1996 |
| JP | 2006-187160 A | 7/2006 |

(Continued)

*Primary Examiner* — Richard Isla Rodas
*Assistant Examiner* — Johali Torres Ruiz
(74) *Attorney, Agent, or Firm* — Lee & Morse, P.C.

(57) ABSTRACT

A battery system includes a first battery pack, a second battery pack, a bidirectional power converter, and a current controller. The first battery pack includes at least one first battery cell. The second battery pack is connected to the first battery pack in parallel and includes at least one second battery cell. The bidirectional power converter is connected between the first battery pack and the second battery pack. The current controller sets a discharge current limit of the first battery pack based on a state of charge of the first battery pack and controls the bidirectional power converter to cause the first battery pack to output a discharge current that is less than or equal to the discharge current limit.

18 Claims, 9 Drawing Sheets

(52) U.S. Cl.
CPC ........... *H01M 10/44* (2013.01); *H02J 7/0029* (2013.01); *H02J 7/0054* (2013.01); *H02J 7/0063* (2013.01); *H02J 7/0065* (2013.01); *H01M 2010/4271* (2013.01); *H01M 2010/4278* (2013.01); *H02J 2007/004* (2013.01); *H02J 2007/0067* (2013.01)

(58) Field of Classification Search
USPC ........................................................ 320/103
See application file for complete search history.

(56) References Cited

U.S. PATENT DOCUMENTS

| | | | | |
|---|---|---|---|---|
| 2011/0198920 | A1* | 8/2011 | Komuro | B60L 7/10 307/10.1 |
| 2012/0319471 | A1* | 12/2012 | Miller | B60L 3/0046 307/9.1 |
| 2013/0221926 | A1* | 8/2013 | Furtner | G06F 1/263 320/129 |
| 2015/0194707 | A1* | 7/2015 | Park | H01M 10/4207 429/50 |
| 2016/0023571 | A1* | 1/2016 | Wu | B60L 11/1864 320/103 |

FOREIGN PATENT DOCUMENTS

| | | |
|---|---|---|
| KR | 10-2004-0000724 A | 1/2004 |
| KR | 10-1097272 B1 | 12/2011 |
| KR | 10-2014-0006301 A | 1/2014 |

* cited by examiner

BATTERY SYSTEM

CROSS-REFERENCE TO RELATED APPLICATION

Korean Patent Application No. 10-2015-0117343, filed on Aug. 20, 2015, and entitled, "Battery System," is incorporated by reference herein in its entirety.

BACKGROUND

1. Field

One or more embodiments described herein relate to a battery system.

2. Description of the Related Art

A variety of battery systems have been developed. A hybrid-type battery system may power a dynamic load, e.g., a load in which power consumption varies significantly. One type of hybrid-type battery system includes a high-capacity battery and a high-output battery. When the high-capacity battery outputs high current to the dynamic load, the high-capacity battery may not completely use all available capacity.

SUMMARY

In accordance with one or more embodiments, a battery system includes a first battery pack including at least one first battery cell; a second battery pack connected to the first battery pack in parallel and including at least one second battery cell; a bidirectional power converter connected between the first battery pack and the second battery pack; and a current controller to set a discharge current limit of the first battery pack based on a state of charge of the first battery pack and to control the bidirectional power converter to cause the first battery pack to output a discharge current that is less than or equal to the discharge current limit. The at least one first battery cell may have a larger capacity than the at least one second battery cell, and the at least one second battery cell may have a larger maximum discharge rate than the at least one first battery cell.

The battery system may include an external terminal connected to a load, wherein the bidirectional power converter includes a first terminal connected to the second battery pack and a second terminal connected to the external terminal and the first battery pack, and is to output electricity stored in the second battery pack to the load or is to output electricity stored in the first battery pack to the second battery pack.

The battery system may include an external terminal connected to a load, wherein the bidirectional power converter includes a first terminal connected to the first battery pack and a second terminal connected to the external terminal and the second battery pack, and is to output electricity stored in the first battery pack to at least one of the load and the second battery pack.

The first battery pack may include a first battery manager to sense a pack voltage and a pack current of the first battery pack, and may determine the SOC of the first battery pack based on the pack voltage and the pack current of the first battery pack, and may transmit the SOC of the first battery pack to the current controller.

The second battery pack may include a second battery manager to sense a pack voltage and a pack current of the second battery pack, may determine an SOC of the second battery pack based on the pack voltage and the pack current of the second battery pack, and may transmit the SOC of the second battery pack to the current controller.

The current controller may adjust a discharge current of the first battery pack by controlling a level of an output voltage of the bidirectional power converter. When the SOC of the first battery pack is equal to or greater than a first reference value, the current controller may set the discharge current limit of the first battery pack to be a first current value corresponding to a maximum discharge rate of the first battery pack, and the first battery pack may output a current, that is less than or equal to the first current value, to at least one of the load or the second battery pack.

The second battery pack may supply a portion of electricity that exceeds electricity corresponding to the maximum discharge rate of the first battery pack, from among electricity consumed by the load. When the SOC of the first battery pack is less than a second reference value, the current controller may set the discharge current limit of the first battery pack to be a second current value that is less than the first current value, electricity consumed by the load may be supplied from the second battery pack, and the first battery pack may charge the second battery pack by outputting to the second battery pack a current that is less than or equal to the second current value.

When the SOC of the first battery pack is equal to or greater than the second current value and is less than the first reference value, the current controller may set the discharge current limit of the first battery pack to be a third current value that is greater than the second current value and less than the first current value. The third current value may vary depending on the SOC of the first battery pack.

When the SOC of the first battery pack is equal to or greater than the second current value and is less than the first reference value, the first battery pack and the second battery pack may supply a portion of electricity that exceeds first electricity from among the electricity consumed by the load, and the first electricity may be supplied by the first battery pack which outputs current of the second current value.

In accordance with one or more other embodiments, a battery system includes an external terminal connected to a load; a first battery pack connected to the external terminal and including at least one first battery cell; a second battery pack including at least one second battery cell; a bidirectional power converter including a first terminal connected to the second battery pack and a second terminal connected to the external terminal and the first battery pack, the bidirectional power converter to output electricity stored in the second battery pack to the load or to output electricity stored in the first battery pack to the second battery pack; and a current controller to set a discharge current limit of the first battery pack based on a state of charge (SOC) of the first battery pack and to control the bidirectional power converter to cause the first battery pack to output a discharge current that is less than or equal to the discharge current limit.

The at least one first battery cell may have a larger capacity than the at least one second battery cell, and he at least one second battery cell may have a larger maximum discharge rate than the at least one first battery cell.

When the SOC of the first battery pack is equal to or greater than a first reference value, the current controller may set the discharge current limit of the first battery pack to be a first current value corresponding to a maximum discharge rate of the first battery pack, and the second battery pack may supply a portion of current that exceeds the discharge current limit of the first battery pack, from among a current consumed by the load.

When the SOC of the first battery pack is less than the first reference value, the current controller may set the discharge current limit of the first battery pack to be a second current value that is less than the first current value, and the second current value may vary depending on the SOC of the first battery pack.

When the SOC of the first battery pack is less than a second reference value that is less than the first reference value, the current controller may set the discharge current limit of the first battery pack to be a third current value that is less than the second current value, current consumed by the load may be supplied from the second battery pack, and the first battery pack may charge the second battery pack by outputting to the second battery pack a discharge current that is less than or equal to the discharge current limit of the first battery pack.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
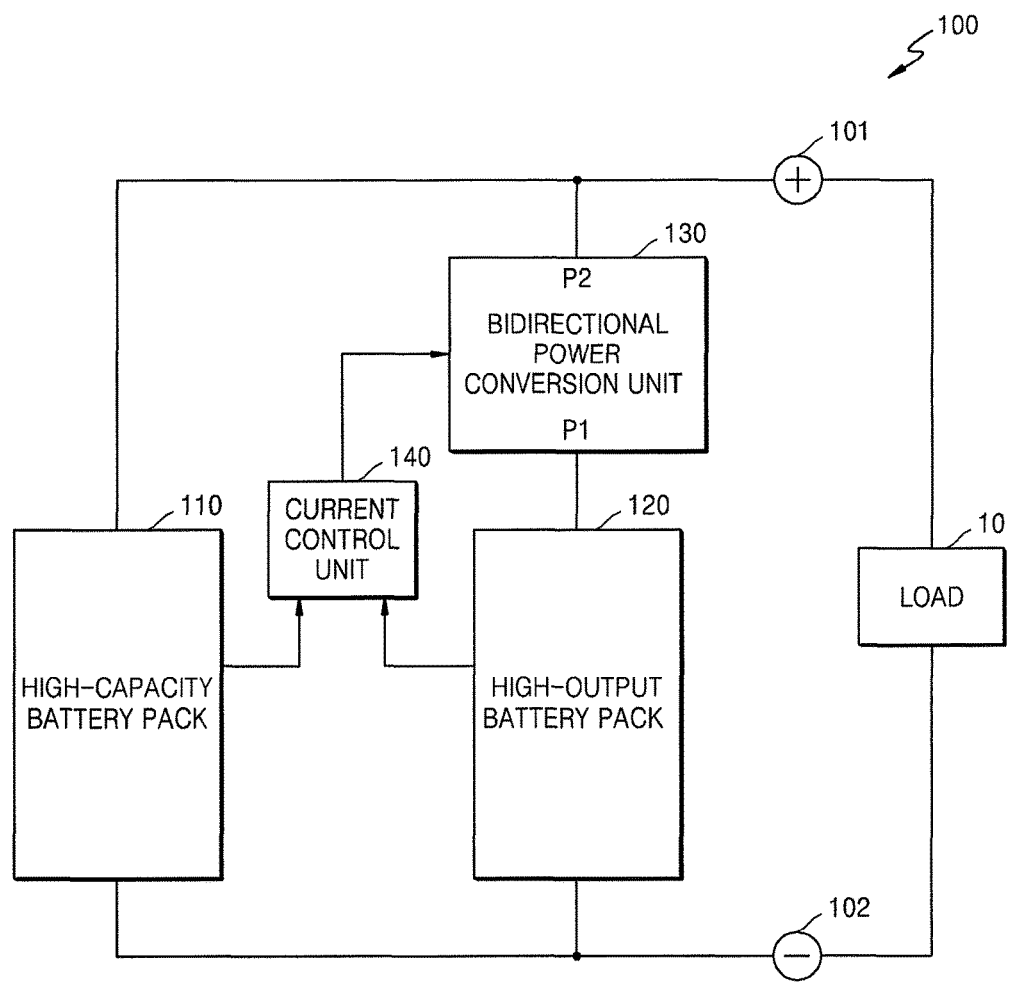
FIG. 1 illustrates an embodiment of a battery system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a battery system 100 which includes a high-capacity battery pack 110, a high-output battery pack 120, a bidirectional power conversion unit 130, a current control unit 140, and external terminals 101 and 102.

The high-capacity battery pack 110 stores electricity and includes at least one first battery cell. The high-capacity battery pack 110 may include a plurality of first battery cells serially connected to one another, connected to one another in parallel, or connected to one another in a serial and parallel arrangement. The number and manner of connection of first battery cells in the high-capacity battery pack 110 may be determined, for example, according to an output voltage and a power storage capacity of the high-capacity battery pack 110.

The high-output battery pack 120 is connected to the high-capacity battery pack 110 in parallel and includes at least one second battery cell. The high-output battery pack 120 may include a plurality of second battery cells serially connected to one another, connected to one another in parallel, or connected to one another in serial and parallel arrangement. The number and manner of connection of the second battery cells in the high-output battery pack 120 may be determined, for example, according to an output voltage and a power storage capacity of the high-output battery pack 120.

The high-capacity battery pack 110 may have a larger capacity than the high-output battery pack 120. The first battery cells of the high-capacity battery pack 110 may have a larger capacity than the second battery cells of the high-output battery pack 120. The capacities of the high-capacity battery pack 110 and the high-output battery pack 120 may be expressed, for example, in units of Wh or Ah.

The high-output battery pack 120 may have a higher maximum discharge rate than the high-capacity battery pack 110. The second battery cells of the high-output battery pack 120 may have a higher maximum discharge rate than the first battery cells of the high-capacity battery pack 110. The maximum discharge rates of the high-capacity battery pack 110 and the high-output battery pack 120 may be expressed, for example, in units of C or A. In one embodiment, the maximum discharge rate of the high-output battery pack 120 may be 10 or more times the maximum discharge rate of the high-capacity battery pack 110. For example, the maximum discharge rate of the high-capacity battery pack 110 may be 3 C and the maximum discharge rate of the high-output battery pack 120 may be 50 C.

The first battery cells of the high-capacity battery pack 110 and the second battery cells of the high-output battery pack 120 may include secondary batteries, e.g., nickel-cadmium batteries, nickel metal hydride (NiMH) batteries, lithium ion batteries, or lithium polymer batteries. In one embodiment, the first battery cells of the high-capacity battery pack 110 and the second battery cells of the high-output battery pack 120 may be secondary batteries of the same type having different electrodes. For example, the first battery cells of the high-capacity battery pack 110 and the second battery cells of the high-output battery pack 120 may all be lithium ion batteries with different maximum discharge rates. In another embodiment, the first battery cells of the high-capacity battery pack 110 may include secondary batteries, and the second battery cells of the high-output battery pack 120 may include super capacitors. (The high-capacity battery pack 110 and the high-output battery pack 120 may be respectively referred to as a first battery pack and a second battery pack).

A load 10 may be connected to the external terminals 101 and 102. Electricity from the high-capacity battery pack 110 and the high-output battery pack 120 may be output to the load 10. A charging device may be connected to the external terminals 101 and 102. Electricity from the charging device may be output to the high-capacity battery pack 110 and the high-output battery pack 120.

The bidirectional power conversion unit 130 is connected between the high-capacity battery pack 110 and the high-output battery pack 120 to convert electricity. As illustrated in FIG. 1, the bidirectional power conversion unit 130 may be connected between the high-capacity battery pack 110 and the external terminal 101. The bidirectional power conversion unit 130 may have a first terminal P1 connected to the high-output battery pack 120 and a second terminal P2 connected to the external terminal 101 and the high-capacity battery pack 110. The bidirectional power conversion unit 130 may output electricity stored in the high-output battery pack 120 to the load 10, or may output electricity stored in the high-capacity battery pack 110 to the high-output battery pack 120. When the charging device has been connected to the external terminals 101 and 102, the bidirectional power conversion unit 130 may output electricity from the charging device to the high-output battery pack 120. The bidirectional power conversion unit 130 may also output electricity stored in the high-output battery pack 120 to the high-capacity battery pack 110.

The high-output battery pack 120 may be charged or discharged via the bidirectional power conversion unit 130. When the high-output battery pack 120 is being discharged, the first terminal P1 of the bidirectional power conversion unit 130 serves as an input terminal and the second terminal P2 thereof serves as an output terminal. On the other hand, when the high-output battery pack 120 is being charged, the second terminal P2 of the bidirectional power conversion unit 130 serves as an input terminal and the first terminal P1 thereof serves as an output terminal.

The bidirectional power conversion unit 130 may adjust a discharge current or a charge current of the high-output battery pack 120. As the discharge current or the charge current of the high-output battery pack 120 is adjusted, a discharge current or a charge current of the high-capacity battery pack 110 may also be adjusted. For example, adjusting the level of an output voltage of the bidirectional power conversion unit 130 or a ratio of the output voltage to an input voltage of the bidirectional power conversion unit 130 may cause the discharge or charge current of the high-capacity battery pack 110 and the discharge or charge current of the high-output battery pack 120 to be adjusted.

According to one example, a pack voltage of the high-capacity battery pack 110 may be substantially the same as a pack voltage of the high-output battery pack 120. The bidirectional power conversion unit 130 may adjust the discharge current or the charge current of the high-output battery pack 120 by adjusting the level of the output voltage of the bidirectional power conversion unit 130. For example, when the high-output battery pack 120 is being discharged and the output voltage of the bidirectional power conversion unit 130 is increased, the discharge current of the high-output battery pack 120 increases. Increasing the discharge current of the high-output battery pack 120 may result in a decrease of the discharge current of the high-capacity battery pack 110.

According to another example, the pack voltage of the high-capacity battery pack 110 may be different from the pack voltage of the high-output battery pack 120. For example, the pack voltage of the high-capacity battery pack 110 may be higher than that of the high-output battery pack 120. The bidirectional power conversion unit 130 may be a DC-DC converter that increases the pack voltage of the high-output battery pack 120 to a discharge voltage between the external terminals 101 and 102 while the high-output battery pack 120 is being discharged, and decreases the pack voltage of the high-output battery pack 120 to a charge voltage between the external terminals 101 and 102 while the high-output battery pack 120 is being charged. In this case, the bidirectional power conversion unit 130 may adjust the discharge current or the charge current of the high-output battery pack 120 by adjusting the level of the output voltage of the bidirectional power conversion unit 130.

For example, the pack voltage of the high-output battery pack 120 may be higher than that of the high-capacity battery pack 110. The bidirectional power conversion unit 130 may be a DC-DC converter that decreases the pack voltage of the high-output battery pack 120 to the discharge voltage between the external terminals 101 and 102 while the high-output battery pack 120 is being discharged, and increases the pack voltage of the high-output battery pack 120 to the charge voltage between the external terminals 101 and 102 while the high-output battery pack 120 is being charged. In this case, the bidirectional power conversion unit 130 may adjust the discharge current or the charge current of the high-output battery pack 120 by adjusting the level of the output voltage of the bidirectional power conversion unit 130.

The current control unit 140 sets a discharge current limit of the high-capacity battery pack 110 based on a state of charge (SOC) of the high-capacity battery pack 110, and controls the bidirectional power conversion unit 130 so that the high-capacity battery pack 110 outputs a discharge current that is less than or equal to the discharge current limit. The current control unit 140 controls a voltage conversion rate of the bidirectional power conversion unit 130, for example, a ratio of the output voltage of the bidirectional power conversion unit 130 to the output voltage thereof, to thereby adjust the discharge or charge current of the high-capacity battery pack 110 and the discharge or charge current of the high-output battery pack 120.

In one embodiment, the current control unit 140 may output a pulse width modulation signal to the bidirectional power conversion unit 130. The bidirectional power conversion unit 130 may receive the pulse width modulation signal and increase or decrease its output voltage based on a duty ratio of the pulse width modulation signal.

For example, when the high-output battery pack 120 is being discharged, a current of the bidirectional power conversion unit 130 flows from the first terminal P1 to the second terminal P2. The first terminal P1 of the bidirectional power conversion unit 130 serves as an input terminal. The second terminal P2 of the bidirectional power conversion unit 130 serves as an output terminal. When the output voltage of the bidirectional power conversion unit 130 increases, a discharge current output from the high-output battery pack 120 increases. As a result, the discharge current of the high-capacity battery pack 110 decreases. On the other hand, when the output voltage of the bidirectional power conversion unit 130 decreases, the discharge current emitted from the high-output battery pack 120 decreases. As a result, the discharge current of the high-capacity battery pack 110 increases.

In this manner, the discharge current of the high-capacity battery pack 110 may be adjusted by adjusting the output voltage of the bidirectional power conversion unit 130. If the discharge current of the high-capacity battery pack 110 exceeds the discharge current limit, the current control unit 140 may increase the output voltage of the bidirectional power conversion unit 130 to decrease the discharge current of the high-capacity battery pack 110.

As another example, when the high-output battery pack 120 is being charged, the current of the bidirectional power conversion unit 130 flows from the second terminal P2 to the first terminal P1, e.g., the first terminal P1 of the bidirectional power conversion unit 130 serves as an output terminal. When the output voltage of the bidirectional power conversion unit 130 increases, a charge current supplied to the high-output battery pack 120 increases. As a result, the charge current of the high-capacity battery pack 110 decreases. On the other hand, when the output voltage of the bidirectional power conversion unit 130 decreases, the charge current supplied to the high-output battery pack 120 decreases. As a result, the charge current of the high-capacity battery pack 110 increases. In this manner, the charge current of the high-capacity battery pack 110 may be adjusted by adjusting the output voltage of the bidirectional power conversion unit 130.

The current control unit 140 may set the discharge current limit of the high-capacity battery pack 110 based on the SOC of the high-capacity battery pack 110. For example, when the SOC of the high-capacity battery pack 110 is equal to or greater than a first reference value, the current control unit 140 may set the discharge current limit of the high-capacity battery pack 110 as a first current value. The first reference value may be, for example, 60%. The first reference value may vary depending, for example, on the capacity and electrical characteristics of the high-capacity battery pack 110. The first current value may correspond to the maximum discharge rate of the high-capacity battery pack 110. For example, when the capacity of the high-capacity battery pack 110 is 100 Ah and the maximum discharge rate thereof is 3, the first current value may be 300 A according to the maximum discharge rate.

In one embodiment, when the SOC of the high-capacity battery pack 110 is less than the first reference value and is equal to or greater than a second reference value, the current control unit 140 may set the discharge current limit of the high-capacity battery pack 110 as a second current value. The second reference value may be, for example, 30%. The second current value may vary depending, for example, on the SOC of the high-capacity battery pack 110. For example, when the SOC of the high-capacity battery pack 110 is 50%, the second current value may be set as a value corresponding to a discharge rate of 2 C. When the SOC of the high-capacity battery pack 110 is 40%, the second current value may be set as a value corresponding to a discharge rate of 1.5 C, for example, as 150A. When the SOC of the high-capacity battery pack 110 is 30%, the second current value may be set as a value corresponding to a discharge rate of 1 C, for example, as 100A.

In one embodiment, when the SOC of the high-capacity battery pack 110 is less than the second reference value, the current control unit 140 may set the discharge current limit of the high-capacity battery pack 110 as a third current value. The third current value may be set as the value corresponding to the discharge rate of 1 C, for example, as 100 A. In this case, the entire current consumed by the load 10 may be supplied from the high-output battery pack 120. The high-capacity battery pack 110 may charge the high-output battery pack 120 by outputting to the high-output battery pack 120 a current that is less than or equal to the third current value.

The current control unit 140 may control the bidirectional power conversion unit 130 so that the high-output battery pack 120 maintains a preset reference SOC, for example, 50%. When the SOC of the high-output battery pack 120 is less than the preset reference SOC, for example, 50%, the current control unit 140 may charge the high-output battery pack 120 using the high-capacity battery pack 110. At this time, the discharge current of the high-capacity battery pack 110 may be restricted to be less than the third current value by the current control unit 140.

Figure 2:
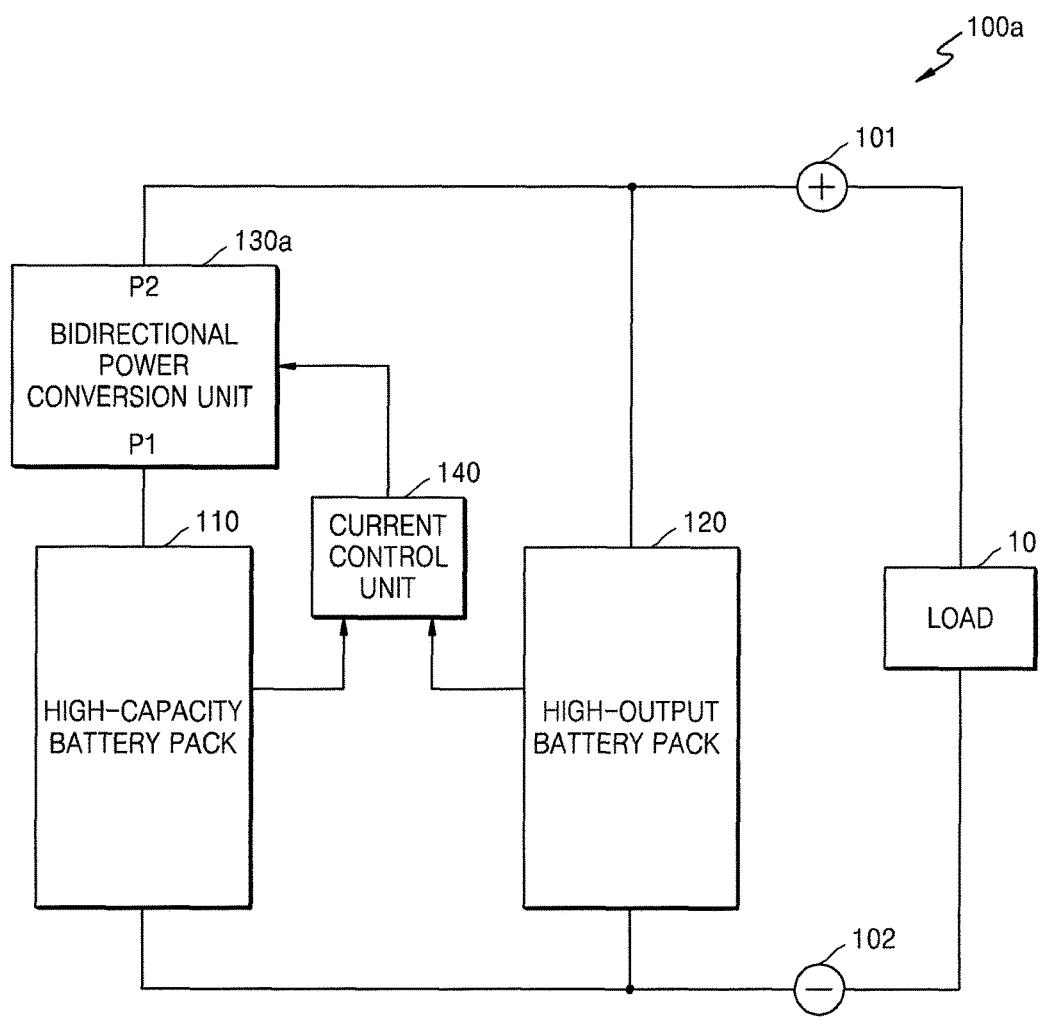
FIG. 2 illustrates another embodiment of a battery system.

FIG. 2 illustrates another embodiment of a battery system 100*a* which includes a high-capacity battery pack 110, a high-output battery pack 120, a bidirectional power conversion unit 130*a*, a current control unit 140, and external terminals 101 and 102. The battery system 100*a* is substantially the same as the battery system 100 of FIG. 1, except for the bidirectional power conversion unit 130*a*.

The bidirectional power conversion unit 130*a* may be connected between the high-capacity battery pack 110 and the external terminal 101. The bidirectional power conversion unit 130 may have a first terminal P1 connected to the high-capacity battery pack 110 and a second terminal P2 connected to the external terminal 101 and the high-output battery pack 120. The bidirectional power conversion unit 130*a* may output electricity stored in the high-capacity battery pack 110 to at least one of the high-output battery pack 120 and the load 10. When a charging device has been connected to the external terminals 101 and 102, the bidirectional power conversion unit 130*a* may output electricity from the charging device to the high-capacity battery pack 110. The bidirectional power conversion unit 130*a* may output electricity stored in the high-output battery pack 120 to the high-capacity battery pack 110.

The high-capacity battery pack 110 may be charged or discharged via the bidirectional power conversion unit 130*a*. When the high-capacity battery pack 110 is being discharged, the first terminal P1 of the bidirectional power conversion unit 130*a* serves as an input terminal and the second terminal P2 of the bidirectional power conversion unit 130*a* serves as an output terminal. On the other hand, when the high-capacity battery pack 110 is being charged, the second terminal P2 of the bidirectional power conversion unit 130*a* serves as an input terminal and the first terminal P1 of the bidirectional power conversion unit 130*a* serves as an output terminal.

The bidirectional power conversion unit 130*a* may adjust a discharge current or a charge current of the high-capacity battery pack 110. For example, by adjusting a level of an output voltage of the bidirectional power conversion unit 130*a* or a ratio of the output voltage to an input voltage of the bidirectional power conversion unit 130*a*, the discharge or charge current of the high-capacity battery pack 110 may be adjusted.

When the high-capacity battery pack 110 is being discharged, the second terminal P2 of the bidirectional power conversion unit 130*a* serves as an output terminal. When an output voltage of the second terminal P2 is increased, the discharge current of the high-capacity battery pack 110 increases, and a discharge current of the high-output battery pack 120 decreases.

When the discharge current of the high-capacity battery pack 110 exceeds a discharge current limit, the current control unit 140 may decrease the discharge current of the high-capacity battery pack 110 to no more than the discharge current limit by decreasing the output voltage of the bidirectional power conversion unit 130*a*.

According to another embodiment, a battery system may include a first bidirectional power conversion unit connected between the high-capacity battery pack 110 and the external terminal 101 and a second bidirectional power conversion unit connected between the high-output battery pack 120 and the external terminal 101. The current control unit 140 may control both the first and second bidirectional power conversion units.

Figure 3:
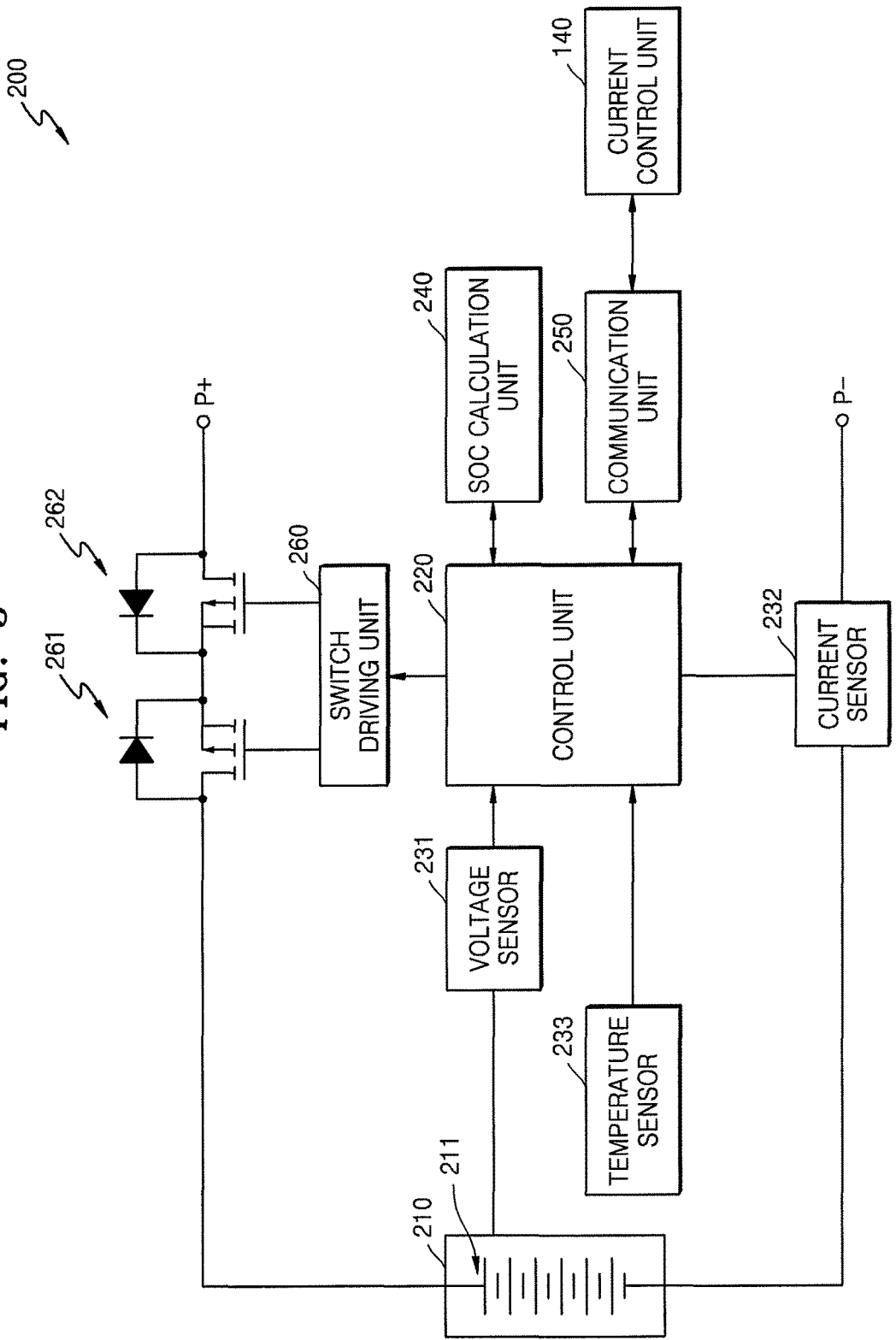
FIG. 3 illustrates an embodiment of a battery pack.

FIG. 3 illustrates an embodiment of a battery pack 200 which includes a battery 210, which includes at least one battery cell 211, and a control unit 220. The battery pack 200 may further include a charging switch 261, a discharging switch 262, and a switch driving unit 260 which drives the charging switch 261 and the discharging switch 262 under the control of the control unit 220. The battery pack 200 may further include a voltage sensor 231 which senses a voltage of the battery 210, a current sensor 232 which senses a current of the battery 210, and a temperature sensor 233 which senses a temperature of the battery 210.

The battery pack 200 may further include an SOC calculation unit 240 which calculates an SOC of the battery 210 based on one or more parameters (e.g., voltage, current, and/or temperature) of the battery 210. The battery pack 200 may further include a communication unit 250 which transmits information (e.g., the SOC and current of the battery 210) to the current control unit 140. The battery pack 200 may include a pack positive terminal P+ and a pack negative terminal P−. The pack positive terminal P+ and the pack negative terminal P− may be connected to the external terminals 101 and 102 of the battery systems 100 and 100a or the bidirectional power conversion units 130 and 130a of the battery systems 100 and 100a. All components of the battery pack 200, other than the battery 210, may be referred to as a battery management unit.

The battery cell 211 may be a rechargeable secondary battery, e.g., a lithium ion battery or a lithium ion polymer battery. In another embodiment, the battery cell 211 may be a liquid metal battery. The battery cell 211 may be selected from various types of secondary batteries according to characteristics (e.g., a high-capacity characteristic or a high-output characteristic) of the battery pack 200. Six battery cells 211 are shown in FIG. 3 as an example. In another embodiment, the battery pack 200 may include more or less than six battery cells, for example, according to the characteristics of the battery pack 200. The battery cells 211 may be serially connected to one another, connected to one another in parallel, or connected to one another in a serial and parallel arrangement.

The charging switch 261 may be connected between the battery 210 and the pack positive terminal P+. When the battery 210 is overcharged, the charging switch 261 may be turned off according to a control signal of the control unit 220 to prevent overcharge of the battery 210. The discharging switch 262 may be connected between the battery 210 and the pack positive terminal P+. When the battery 210 is overdischarged, the discharging switch 262 may be turned off according to a control signal of the control unit 220 to prevent overdischarge of the battery 210. The charging switch 261 and the discharging switch 262 may be MOSFETs or relays. The switch driving unit 260 turns on or off the charging switch 261 and/or the discharging switch 262 according to the control signal of the control unit 220.

The voltage sensor 231 may be connected to the battery cells 211 in parallel and operate to sense cell voltages of the battery cells 211. The voltage sensor 231 may convert the sensed cell voltages to digital signals, and the digital signals may be transmitted to the control unit 220. When the battery cells 211 are serially connected to one another, the control unit 220 may calculate a pack voltage by adding up the cell voltages of the battery cells 211. According to another example, the voltage sensor 231 may directly sense the pack voltage and transmit the sensed pack voltage to the control unit 220.

The current sensor 232 may be connected between the battery 210 and the pack negative terminal P− and operates to sense a charge current and a discharge current of the battery 210. The current sensor 232 may convert the sensed charge current and the sensed discharge current to digital signals, and the digital signals may be transmitted to the control unit 220. The current sensor 232 may be a current sensing resistor.

The temperature sensor 233 may be attached directly to the battery cells 211 or may be provided around the battery cells 211. The temperature sensor 233 senses temperatures of one or more of the battery cells 211 or ambient temperature. The temperature sensor 233 may convert the sensed temperatures to digital signals and may transmit the digital signals to the control unit 220. The temperature sensor 233 may be, for example, a thermistor.

The SOC calculation unit 240 may calculate the SOC of the battery 210 based on one or more of the voltage, current, or temperature information of the battery 210 from the control unit 220. According to an example, the SOC calculation unit 240 may determine an open circuit voltage of the battery 210 based on voltage and current information and may calculate the SOC of the battery 210 based on the open circuit voltage. A storage unit may store information corresponding to a relationship between the open circuit voltage and the SOC of the battery 210. The storage unit may be included in or connected to the SOC calculation unit 240. According to another example, the SOC calculation unit 240 may calculate the SOC of the battery 210 based on voltage and current information of the battery 210 using a predetermined method, e.g., a current integration method.

The control unit 220 may control the switch driving unit 162 based on information from, for example, the voltage sensor 231, the current sensor 232, and/or the temperature sensor 233. In one embodiment, when the control unit 220 determines, based on the voltage information from the voltage sensor 231, that the battery cells 211 have been overcharged or overdischarged, the control unit 220 may transmit a control signal to the switch driving unit 260 to turn off the charging switch 261 or the discharging switch 262.

When the control unit 220 determines, based on the current information from the current sensor 232, that an overcurrent flows in the battery 210, the control unit 220 may transmit a control signal to the switch driving unit 260 to turn off the charging switch 261 or the discharging switch 262.

When the control unit 220 determines, based on the temperature information from the temperature sensor 233, that the battery 210 is at a high temperature, the control unit 220 may transmit a control signal to the switch driving unit 260 to turn off the charging switch 261 or the discharging switch 262.

When the control unit 220 determines that the SOC of the battery 210, calculated by the SOC calculation unit 240, has reached a full charge state (e.g., 100% or above another predetermined percentage), the control unit 220 may transmit a control signal to the switch driving unit 260 to turn off the charging switch 261. When the control unit 220 determines that the SOC of the battery 210, calculated by the SOC calculation unit 240, has reached a full discharge state (e.g., 0% or below another predetermined percentage), the control unit 220 may transmit a control signal to the switch driving unit 260 to turn off the discharging switch 262.

The control unit 220 may transmit information about the battery 210 to the current control unit 220 using the communication unit 250. For example, the communication unit 250 may transmit voltage information, current information, temperature information, and/or SOC information of the battery 210 to the current control unit 220.

The battery pack 200 may correspond to the high-capacity battery pack 110 or the high-output battery pack 120 of FIGS. 1 and 2. Each of the high-capacity battery pack 110 and the high-output battery pack 120 may have the same structure as the battery pack 200.

When the high-capacity battery pack 110 of FIGS. 1 and 2 has the same structure as the battery pack 200, a battery management unit of the high-capacity battery pack 110 may sense a pack voltage and a pack current of the high-capacity battery pack 110, determine the SOC of the high-capacity battery pack 110 based on the pack voltage and the pack current of the high-capacity battery pack 110, and transmit the SOC of the high-capacity battery pack 110 to the current control unit 140. The battery management unit of the high-capacity battery pack 110 may transmit the pack voltage and the pack current of the high-capacity battery pack 110 to the current control unit 140. The battery management unit of the high-capacity battery pack 110 may be referred to a first battery management unit.

When the high-output battery pack 120 of FIGS. 1 and 2 has the same structure as the battery pack 200, a battery management unit of the high-output battery pack 120 may sense a pack voltage and a pack current of the high-output battery pack 120, determine the SOC of the high-output battery pack 120 based on a pack voltage and a pack current of the high-output battery pack 120, and transmit the SOC of the high-output battery pack 120 to the current control unit 140. The battery management unit of the high-output battery pack 120 may transmit the pack voltage and the pack current of the high-output battery pack 120 to the current control unit 140. The battery management unit of the high-output battery pack 120 may be referred to a second battery management unit.

Figure 4:
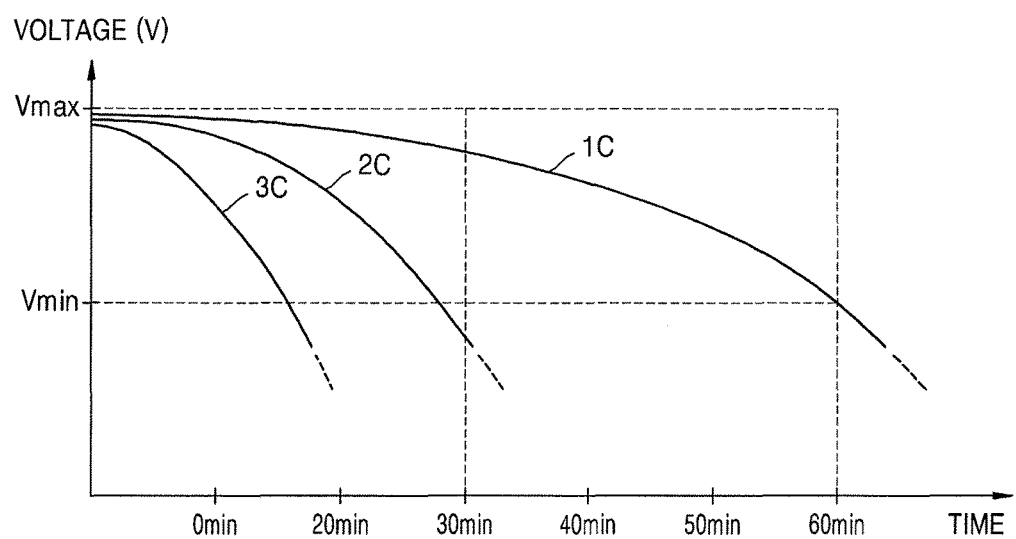
FIG. 4 illustrates examples of battery discharge characteristics.

FIG. 4 illustrates an example of discharge characteristics of the high-capacity battery pack 110 in FIGS. 1 and 2. Referring to FIG. 4, a voltage of the high-capacity battery pack 110 with respect to time when the high-capacity battery pack 110 is discharged at a certain discharge rate is shown. In this example, it is assumed that the maximum discharge rate of the high-capacity battery pack 110 is 3 C and the high-capacity battery pack 110 is in a full charge state when time is 0. A pack voltage of the high-capacity battery pack 110 in a full charge state may be substantially the same as an overcharge voltage Vmax.

When discharge starts, a voltage drop occurs due to an internal resistance of the battery of the high-capacity battery pack 110. The higher a discharge rate of the high-capacity battery pack 110 is, the larger the voltage drop is.

When the high-capacity battery pack 110 is discharged at a discharge rate of 1 C, the pack voltage of the high-capacity battery pack 110 reaches an overdischarge voltage Vmin after the lapse of one hour.

When the high-capacity battery pack 110 is discharged at a discharge rate of 2 C, the pack voltage of the high-capacity battery pack 110 reaches the overdischarge voltage Vmin before the lapse of 30 minutes, for example, after the lapse of 27 minutes. In other words, the high-capacity battery pack 110 is unable to use about 10% of its entire capacity.

When the high-capacity battery pack 110 is discharged at a discharge rate of 3 C, the pack voltage of the high-capacity battery pack 110 reaches the overdischarge voltage Vmin before the lapse of 20 minutes, for example, after the lapse of 15 minutes. In other words, about 25% of the entire capacity of the high-capacity battery pack 110 may not be used.

When the high-capacity battery pack 110 is discharged at a high discharge rate, since the pack voltage of the high-capacity battery pack 110 reaches the overdischarge voltage Vmin before the SOC of the high-capacity battery pack 110 reaches an overdischarge state due to the voltage drop caused by the internal resistance of the high-capacity battery pack 110, the entire capacity of the high-capacity battery pack 110 may not be used. Heat loss may occur due to the internal resistance of the high-capacity battery pack 110. When the high-capacity battery pack 110 is discharged at a high discharge rate, the efficiency of a chemical reaction of the high-capacity battery pack 110 may degrade.

According to various embodiments, when a discharge rate is controlled according to the SOC of the high-capacity battery pack 110, a portion of the entire capacity of the high-capacity battery pack 110 that is unable to be used may be reduced.

Figure 5:
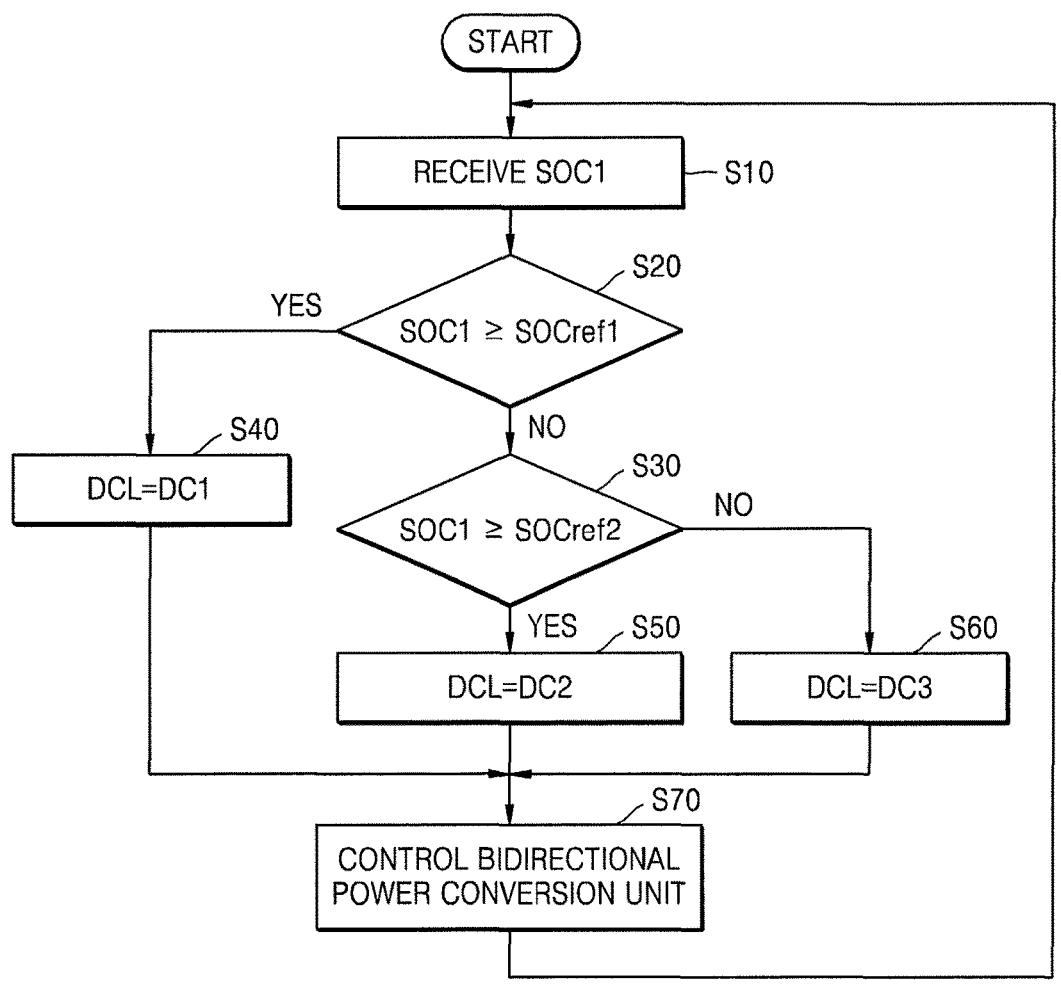
FIG. 5 illustrates an embodiment of a method for controlling a battery system.

FIG. 5 illustrates an embodiment of a method for controlling a battery system, which may be any of the aforementioned embodiments. Operation of the current control unit 140 of the battery systems 100 and 100a will be discussed.

Referring to FIG. 5, in operation S10, the current control unit 140 receives an SOC SOC1 of the high-capacity battery pack 110 from the battery management unit of the high-capacity battery pack 110.

In operation S20, the current control unit 140 compares the SOC SOC1 of the high-capacity battery pack 110 with a first reference value SOCref1. When the SOC SOC1 of the high-capacity battery pack 110 is less than the first reference value SOCref1, the current control unit 140 compares the SOC SOC1 of the high-capacity battery pack 110 with a second reference value SOCref2, in operation S30. The second reference value SOCref2 may be previously set to be less than the first reference value SOCref1. For example, the first reference value SOCref1 may be 60%, and the second reference value SOCref2 may be 30%.

When the SOC SOC1 of the high-capacity battery pack 110 is equal to or greater than the first reference value SOCref1, a discharge current limit DCL of the high-capacity battery pack 110 may be set to be a first current value DC1, in operation S40. The first current value DC1 may correspond to the maximum discharge rate of the high-capacity battery pack 110. For example, when the capacity of the high-capacity battery pack 110 is 100 Ah and the maximum discharge rate thereof is 3 C, the first current value DC1 may be 300 A according to the maximum discharge rate. The high-capacity battery pack 110 may output only a current that is less than or equal to the first current value DC1. The current may be provided to the load 10 or may be provided to the high-output battery pack 120 in order to charge the high-output battery pack 120.

The load 10 may consume a larger current than a current of the first current value DC1 supplied from the high-capacity battery pack 110. In this case, the high-output battery pack 120 may supply a portion of the current exceeding the first current value DC1 from among the current consumed by the load 10. For example, the high-output battery pack 120 may supply a portion exceeding electricity corresponding to the maximum discharge rate of the high-capacity battery pack 110 from among electricity consumed by the load 10. Since a maximum discharge rate of the high-output battery pack 120 is high, even when the load 10 consumes a large current, the high-output battery pack 120 is able to supply a large amount of current to the load 10.

When the SOC SOC1 of the high-capacity battery pack 110 is less than the first reference value SOCref1 and is equal to or greater than a second reference value SOCref2, the discharge current limit DCL of the high-capacity battery pack 110 may be set to be a second current value DC2 in operation S50. The second current value DC2 is less than the first current value DC1 and may be set to vary depending, for example, on the SOC of the high-capacity battery pack 110. For example, when the SOC of the high-capacity battery pack 110 is 50%, the second current value DC2 may be set to be 200 A. When the SOC of the high-capacity battery pack 110 is 40%, the second current value DC2 may be set to be 150 A.

The second current value DC2 may be previously set according to the SOC of the high-capacity battery pack 110. The high-capacity battery pack 110 may output only a current that is less than or equal to the second current value DC2. The current may be provided to the load 10 or may be provided to the high-output battery pack 120 in order to charge the high-output battery pack 120.

The load 10 may consume a larger current than a current of the second current value DC2 capable of being supplied from the high-capacity battery pack 110. In this case, the high-output battery pack 120 may supply a portion of the current exceeding the second current value DC2 from among the current consumed by the load 10. For example, the high-output battery pack 120 may supply a portion that exceeds electricity capable of being supplied by the high-capacity battery pack 110 via the current of the second current value DC2, from among electricity consumed by the load 10. Since the maximum discharge rate of the high-output battery pack 120 is high, even when the load 10 consumes a large current, the high-output battery pack 120 is able to supply a large amount of current to the load 10.

When the SOC SOC1 of the high-capacity battery pack 110 is less than the second reference value SOCref2, the discharge current limit DCL of the high-capacity battery pack 110 may be set to be a third current value DC3 in operation S60. The third current value DC3 is less than the second current value DC2. For example, when the capacity of the high-capacity battery pack 110 is 100 Ah, the third current value DC3 may be 100 A according to a discharge rate of 1 C. The electricity consumed by the load 10 may be supplied from the high-output battery pack 120. The high-capacity battery pack 110 may output to the high-output battery pack 120 a current that is less than or equal to the third current value DC3. The high-output battery pack 120 may be charged using the current.

According to another example, when the SOC SOC1 of the high-capacity battery pack 110 is less than the first reference value SOCref1 and is equal to or greater than the second reference value SOCref2, the high-capacity battery pack 110 and the high-output battery pack 120 may supply a portion that exceeds electricity capable of being supplied by the high-capacity battery pack 110 via a current of the third current value DC3, from among the electricity consumed by the load 10. In this case, a ratio between electricity supplied by the high-capacity battery pack 110 and that supplied by the high-output battery pack 120 may be determined according to the SOC SOC1 of the high-capacity battery pack 110. For example, the higher the SOC SOC1 of the high-capacity battery pack 110 is, the higher the rate at which the high-capacity battery pack 110 supplies electricity may be.

According to another example, the first reference value SOCref1 and the second reference value SOCref2 may be equal to each other. In this case, operations S30 and S50 may be omitted.

In operation S70, the current control unit 140 may control the bidirectional power conversion unit 130 in order to control the discharge current of the high-capacity battery pack 110 according to the discharge current limit DCL of the high-capacity battery pack 110. The current control unit 140 may control the discharge current of the high-capacity battery pack 110 by adjusting the levels of the output voltages of the bidirectional power conversion units 130 and 130*a*. For example, in the case of the battery system 100 of FIG. 1, the current control unit 140 may decrease the discharge current of the high-capacity battery pack 110 by increasing the level of the output voltage of the bidirectional power conversion unit 130. In other words, the current control unit 140 may increase the level of the output voltage of the bidirectional power conversion unit 130 in order to decrease the discharge current of the high-capacity battery pack 110 to no more than the discharge current limit DCL.

In the case of the battery system 100*a* of FIG. 2, the current control unit 140 may decrease the discharge current of the high-capacity battery pack 110 by decreasing the level of the output voltage of the bidirectional power conversion unit 130*a*. In other words, the current control unit 140 may decrease the level of the output voltage of the bidirectional power conversion unit 130 in order to decrease the discharge current of the high-capacity battery pack 110 to no more than the discharge current limit DCL.

FIGS. 6A-6D are graphs illustrating examples of electricity supplied by a high-capacity battery pack and a high-output battery pack of a battery system according to an embodiment.

Figure 6A:
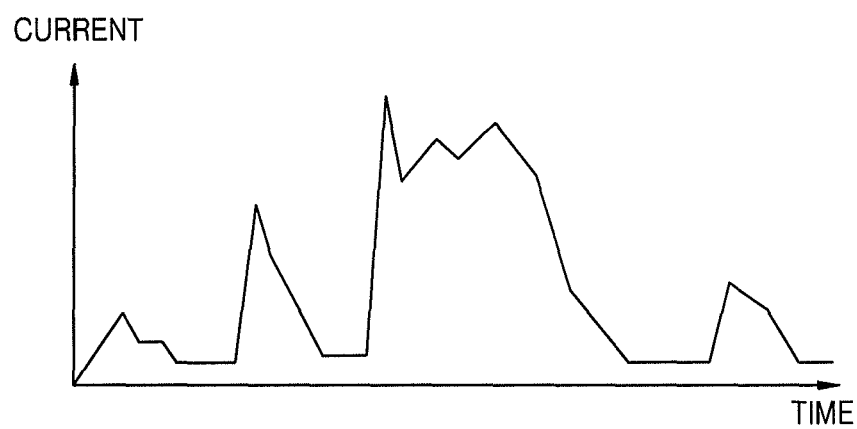
FIGS. 6A-6D illustrate examples of electricity supplied by according to one or more embodiments.

FIG. 6A is a graph showing an example of current consumed by the load 10 with respect to time. The load 10 may be, for example, a device that lifts a product or moves by itself such as a motor-operated forklift. When the device starts moving or lifts a product, a large amount of current may be consumed. When the device is moved by inertia, a medium level of current may be consumed. When the device does not move or is holding a lifted product, a small amount of current may be consumed. According to another example, when the load 10 stops moving, the battery system 100 may be charged by converting kinetic energy to electric energy. When the load 10 puts the lifted product down, the battery system 100 may also be charged by converting potential energy to electric energy.

Figure 6B:
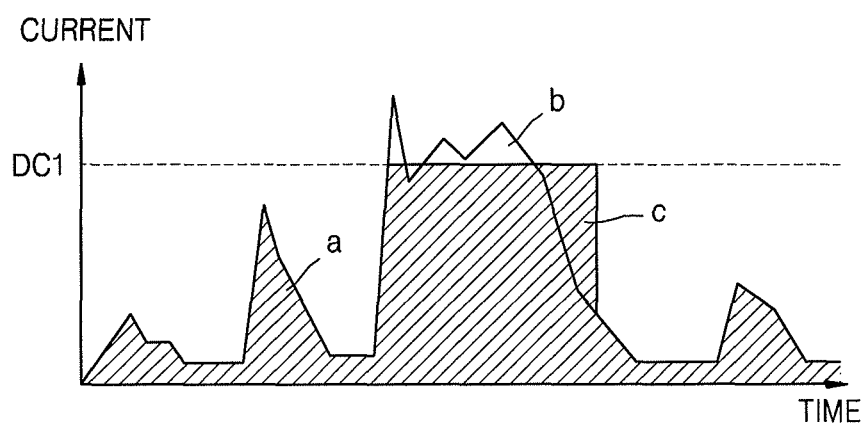
Figure 6C:
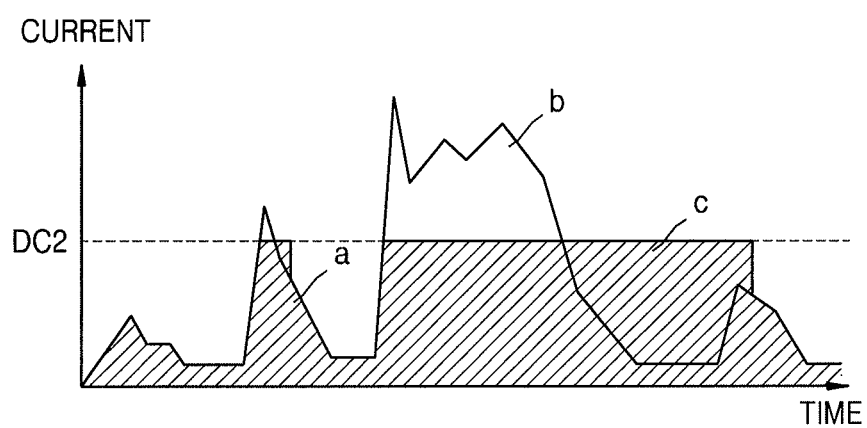
Figure 6D:
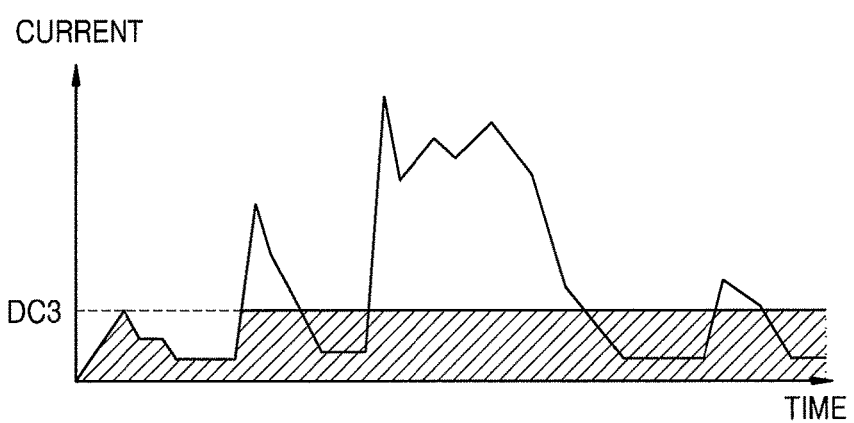

FIGS. 6B-6D show examples of currents supplied by the high-capacity battery pack 110 and the high-output battery pack 120 in correspondence with the consumption current of the load 10 in FIG. 6A. FIG. 6B is a current graph when the SOC SOC1 of the high-capacity battery pack 110 is equal to or greater than the first reference value SOCref1. FIG. 6C is a current graph when the SOC SOC1 of the high-capacity battery pack 110 is less than the first reference value SOCref1 and is equal to or greater than the second reference value SOCref2. FIG. 6D is a current graph when the SOC SOC1 of the high-capacity battery pack 110 is less than the second reference value SOCref2.

Hatched portions shown in FIGS. 6B-6D indicate discharge currents supplied by the high-capacity battery pack 110. Load currents that exceed discharge current limits indicated by dotted lines of FIGS. 6B and 6C are supplied by the high-output battery pack 120. A load current in FIG. 6D is supplied by the high-output battery pack 120. For ease of understanding, it may be assumed that the high-capacity battery pack 110 and the high-output battery pack 120 have substantially the same pack voltage. It also may be assumed that the SOC of the high-output battery pack 120 is an initially-predetermined reference SOC, for example, 50%.

Referring to FIG. 6B, when the SOC SOC1 of the high-capacity battery pack 110 is equal to or greater than the first reference value SOCref1, the discharge current limit DCL of the high-capacity battery pack 110 is set to be the first current value DC1. The high-capacity battery pack 110 may output a discharge current that is less than or equal to the first current value DC1.

Reference character a in FIG. 6B corresponds to a discharge current supplied by the high-capacity battery pack 110 to the load 10. Reference character b in FIG. 6B corresponds to a discharge current that is supplied by the high-output battery pack 120 to the load 10. The high-output battery pack 120 supplies a portion (discharge current b) exceeding the first current value DC1 from among the load current. Reference character c in FIG. 6B corresponds to a discharge current that is supplied by the high-capacity battery pack 110 to the high-output battery pack 120. The high-output battery pack 120 may be set to maintain the reference SOC. The high-capacity battery pack 110 may supply current that is less than or equal to the first current value DC1 to the high-output battery pack 120 such that the high-output battery pack 120 may maintain the reference SOC.

Referring to FIG. 6C, when the SOC SOC1 of the high-capacity battery pack 110 is less than the first reference value SOCref1 and is equal to or greater than the second reference value SOCref2, the discharge current limit DCL of the high-capacity battery pack 110 is set to be the second current value DC2. The second current value DC2 is less than the first current value DC1 and may vary depending on the SOC of the high-capacity battery pack 110. The high-capacity battery pack 110 may output a discharge current that is less than or equal to the second current value DC2.

Reference character a in FIG. 6C corresponds to a discharge current supplied by the high-capacity battery pack 110 to the load 10. Reference character b in FIG. 6C corresponds to a discharge current supplied by the high-output battery pack 120 to the load 10. The high-output battery pack 120 supplies a portion (discharge current b) that exceeds the second current value DC2 from among the load current. Reference character c in FIG. 6C corresponds to a discharge current supplied by the high-capacity battery pack 110 to the high-output battery pack 120. The high-output battery pack 120 may be set to maintain the reference SOC, and the high-capacity battery pack 110 may supply the current that is less than or equal to the second current value DC2 to the high-output battery pack 120 such that the high-output battery pack 120 may maintain the reference SOC.

Referring to FIG. 6D, when the SOC SOC1 of the high-capacity battery pack 110 is less than the second reference value SOCref2, the discharge current limit DCL of the high-capacity battery pack 110 is set to be the third current value DC3. The third current value DC3 may be less than the second current value DC2 or a minimum value of the second current value DC2. The high-capacity battery pack 110 may output a discharge current that is less than or equal to the third current value DC3.

A current consumed by the load 10 is supplied by the high-output battery pack 120. In other words, the entire current consumed by the load 10 is supplied from the high-output battery pack 120. As in the hatched portion of FIG. 6D, the high-capacity battery pack 110 may charge the high-output battery pack 120 with the current that is less than or equal to the third current value DC3.

According to various embodiments, the high-capacity battery pack 110 is discharged at a high discharge rate when its SOC is high (e.g., above a predetermined value), whereas the discharge current limit of the high-capacity battery pack 110 is set when its SOC is low, e.g., below the predetermined value. Thus, the high-capacity battery pack 110 may be discharged only at a low discharge rate (e.g., below a predetermined value) when its SOC is low. Since a voltage drop due to the internal resistance of the high-capacity battery pack 110 is relatively small, a problem in which the standard capacity of the high-capacity battery pack 110 fails to be entirely used, because the high-capacity battery pack 110 reaches an overdischarge voltage before reaching a full discharge state, may be addressed.

When the high-capacity battery pack 110 is discharged at a high discharge rate, reaction efficiency decreases. However, while the high-capacity battery pack 110 is being discharged at a low discharge rate when the SOC of the high-capacity battery pack 110 is low, the reaction efficiency increases. Thus, chemical energy not used at a high discharge rate is able to be used. Accordingly, the amount of capacity that was unable to be used may be reduced.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, management circuits, and other processing features of the embodiments described herein may be implemented in logic which, for example, may include hardware, software, or both. When implemented at least partially in hardware, the controllers, management circuits, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, management circuits, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present embodiments as set forth in the following claims.

What is claimed is:

1. A battery system, comprising:
    a first battery pack including at least one first battery cell;
    a second battery pack connected to the first battery pack in parallel and including at least one second battery cell;
    a bidirectional power converter connected between the first battery pack and the second battery pack; and
    a current controller to set a discharge current limit of the first battery pack based on a state of charge (SOC) of the first battery pack, and to control the bidirectional power converter to cause the first battery pack to output a discharge current that is less than or equal to the discharge current limit, wherein:
    when the SOC of the first battery pack is equal to or greater than a first reference value, the current controller is to set the discharge current limit of the first battery pack to be a first current value corresponding to a maximum discharge rate of the first battery pack, and
    when the SOC of the first battery pack is less than a second reference value that is less than the first reference value, the current controller is to set the discharge current limit of the first battery pack to be a second current value that is less than the first current value.

2. The battery system as claimed in claim 1, wherein
    the at least one first battery cell has a larger capacity than the at least one second battery cell, and
    the at least one second battery cell has a larger maximum discharge rate than the at least one first battery cell.

3. The battery system as claimed in claim 1, further comprising:
    an external terminal connected to a load,
    wherein the bidirectional power converter includes a first terminal connected to the second battery pack and a second terminal connected to the external terminal and the first battery pack, and is to output electricity stored in the second battery pack to the load or is to output electricity stored in the first battery pack to the second battery pack.

4. The battery system as claimed in claim 1, further comprising:
    an external terminal connected to a load,
    wherein the bidirectional power converter includes a first terminal connected to the first battery pack and a second terminal connected to the external terminal and the second battery pack, and is to output electricity stored in the first battery pack to at least one of the load and the second battery pack.

5. The battery system as claimed in claim 1, wherein the first battery pack includes a first battery manager to sense a pack voltage and a pack current of the first battery pack, to determine a state of charge (SOC) of the first battery pack based on the pack voltage and the pack current of the first battery pack, and to transmit the SOC of the first battery pack to the current controller.

6. The battery system as claimed in claim 1, wherein the second battery pack includes a second battery manager to sense a pack voltage and a pack current of the second battery pack, to determine an SOC of the second battery pack based on the pack voltage and the pack current of the second battery pack, and to transmit the SOC of the second battery pack to the current controller.

7. The battery system as claimed in claim 1, wherein the current controller is to adjust a discharge current of the first battery pack by controlling a level of an output voltage of the bidirectional power converter.

8. The battery system as claimed in claim 1, wherein
    the first battery pack is to output a current, that is less than or equal to the first current value, to at least one of a load or the second battery pack.

9. The battery system as claimed in claim 8, wherein the second battery pack supplies a portion of electricity that exceeds electricity corresponding to the maximum discharge rate of the first battery pack, from among electricity consumed by the load.

10. The battery system as claimed in claim 8, wherein
    electricity consumed by the load is to be supplied from the second battery pack, and
    the first battery pack is to charge the second battery pack by outputting to the second battery pack a current that is less than or equal to the second current value.

11. The battery system as claimed in claim 10, wherein:
    when the SOC of the first battery pack is equal to or greater than the second reference value and is less than the first reference value, the current controller is to set the discharge current limit of the first battery pack to be a third current value that is greater than the second current value and less than the first current value.

12. The battery system as claimed in claim 11, wherein the third current value varies depending on the SOC of the first battery pack.

13. The battery system as claimed in claim 10, wherein:
    when the SOC of the first battery pack is equal to or greater than the second reference value and is less than the first reference value, the first battery pack and the second battery pack are to supply a portion of electricity that exceeds first electricity from among the electricity consumed by the load, and
    the first electricity is to be supplied by the first battery pack which outputs current of the second current value.

14. A battery system, comprising:
    an external terminal connected to a load;
    a first battery pack connected to the external terminal and including at least one first battery cell;
    a second battery pack including at least one second battery cell;
    a bidirectional power converter including a first terminal connected to the second battery pack and a second terminal connected to the external terminal and the first battery pack, the bidirectional power converter to output electricity stored in the second battery pack to the load or to output electricity stored in the first battery pack to the second battery pack; and
    a current controller to set a discharge current limit of the first battery pack based on a state of charge (SOC) of the first battery pack, and to control the bidirectional power converter to cause the first battery pack to output a discharge current that is less than or equal to the discharge current limit, wherein:

when the SOC of the first battery pack is equal to or greater than a first reference value, the current controller is to set the discharge current limit of the first battery pack to be a first current value corresponding to a maximum discharge rate of the first battery pack, and when the SOC of the first battery pack is less than the first reference value, the current controller is to set the discharge current limit of the first battery pack to be a second current value that is less than the first current value.

15. The battery system as claimed in claim 14, wherein:
the at least one first battery cell has a larger capacity than the at least one second battery cell, and
the at least one second battery cell has a larger maximum discharge rate than the at least one first battery cell.

16. The battery system as claimed in claim 14, wherein:
the second battery pack is to supply a portion of current that exceeds the discharge current limit of the first battery pack, from among a current consumed by the load.

17. The battery system as claimed in claim 16, wherein:
the second current value is to vary depending on the SOC of the first battery pack.

18. The battery system as claimed in claim 17, wherein:
when the SOC of the first battery pack is less than a second reference value that is less than the first reference value, the current controller is to set the discharge current limit of the first battery pack to be a third current value that is less than the second current value, current consumed by the load is to be supplied from the second battery pack, and the first battery pack is to charge the second battery pack by outputting to the second battery pack a discharge current that is less than or equal to the discharge current limit of the first battery pack.

* * * * *